United States Patent Office
3,637,871
Patented Jan. 25, 1972

3,637,871
POLYFLUOROTRICYCLOALKENES
Joseph D. Park and Sam Kwon Choi, Boulder, Colo., assignors to Minnesota Mining and Manufacturing Company, St. Paul, Minn.
No Drawing. Filed Feb. 4, 1970, Ser. No. 8,691
Int. Cl. C07c 25/18
U.S. Cl. 260—649 F
5 Claims

ABSTRACT OF THE DISCLOSURE

Polyfluorotricycloalkenes having the formula:

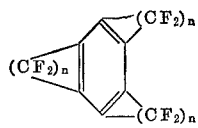

wherein $n$ is 2, 3, or 4 are prepared by subjecting certain fluoroalicyclic halide compounds to high temperature in the presence of metallic copper. The compounds are useful as cryogenic lubricants in equipment intended for the preparation and use of liquid oxygen.

BACKGROUND OF THE INVENTION

The present invention relates to the preparation of compounds having the formula:

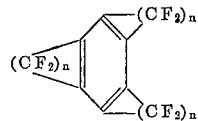

wherein $n$ is 2, 3, or 4 by passing the corresponding iodo compound through metallic copper at a temperature of from about 200 to 220° C.

SUMMARY OF THE INVENTION

According to the present invention, polyfluorotricycloalkenes having the formulae:

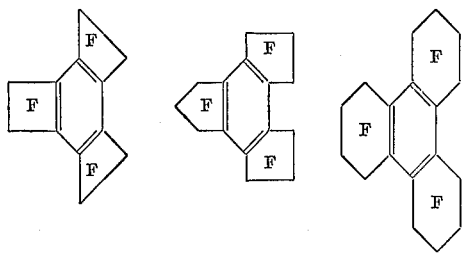

are prepared by subjecting the corresponding halide compound to temperatures of from about 200 to 220° C. with a copper catalyst.

The starting materials preferably are the following:

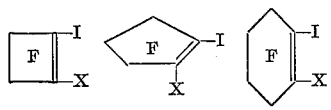

where X is chlorine, bromine or iodine.

In addition to preparing compounds wherein all the cyclic alkene entities are the same, the above-mentioned starting compounds may be used in various combinations to prepare polyfluorotricycloalkenes having different cyclic alkene entities on one molecule. The procedure for preparing such compounds would be the same, only two or more of the preferred starting materials would be used together.

Without being bound by this theory, applicants believe that the mechanistic pathway is a two-step process, the reaction starting with an attack by copper at the carbon atom bearing the halide to form an activated complex at the metal surface. The occurrence of this step is influenced by the susceptibility of the system to nucleophilic attack and is thus favored by electron withdrawing substituents. In the second step, the activated complex reacts with a second molecule of the halide at the copper surface to give the bicyclic or tricyclic compounds and cupric halide.

It is believed that the reaction of polyfluorocyclopentenes involving copper undergoes an intermediate step in the coupling reaction as illustrated in the following typical reaction.

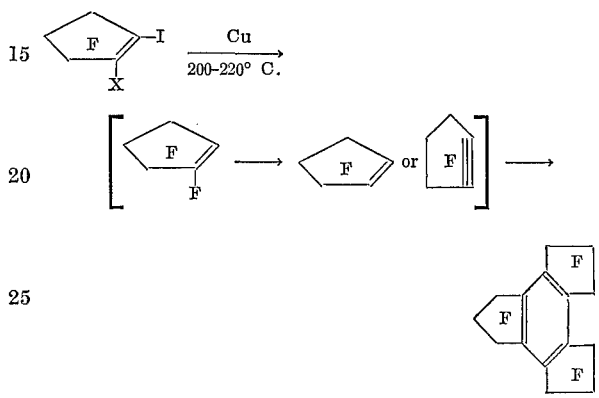

Because of the structure of these compounds, particularly the aromatic benzene ring nucleus, the compounds show exceptional stability to thermal and chemical reactions while at the same time demonstrating the well-known incompatability with and insolubility in hydrocarbon and aqueous, polar and non-polar, solvents characteristic of the fluorocarbons.

These high melting, completely fluorinated aromatic compounds are particularly useful because of their insolubility, stability and the plate-like nautre of the crystal, as cryogenic lubricants in equipment intended for the preparation and use of liquid oxygen.

The invention will be further understood by reference to the following illustrative, but non-limiting examples, in which all parts are by weight unless otherwise noted.

Example 1.—Preparation of tris-(di-difluoromethylene)-benzene

A 7.6 g. (0.02 mole) of 1,2-diiodotetrafluorocyclobutene was placed in a 50 ml. dropping funnel which was connected to a Pyrex tube packed with copper turnings and 20 g. of powdered copper. The 1,2-diiodotetrafluorocyclobutene was passed through the Pyrex tube slowly at 200–220° C. The crude solid product thus obtained was recrystallized from n-hexane followed by sublimation to yield 1.0 g. (13% of theory) of tris-(di-difluoromethylene)-benzene M.P. 135–136° C.

Analysis.—Calcd. for $C_{12}F_{12}$ (percent): C, 38.71; F, 61.29. Found (percent): C, 38.35; F, 61.32.

The infrared spectrum of the compound contained a strong absorption at 1630 cm.$^{-1}$ ascribable to double bond stretching frequency and the mass spectrum confirmed the assigned structure with a molecular ion at $m/e{=}372$.

Example 2.—Preparation of tris-(tri-difluoromethylene)-benzene

A 8.3 g. (0.03 mole) sample of 1-iodo-2-chlorohexafluorocyclopentene was placed in a 50 ml. dropping funnel which was connected to a Pyrex tube packed with copper turnings and 20 g. of powdered copper. The 1-iodo-2-chlorohexafluorocyclopentene was passed through the copper packed Pyrex tube slowly at 200–220° C. The solid product thus obtained was recrystallized from n-hexane followed by sublimation to yield 4.6 g. (56% of theory) of tris-(tri-difluoromethylene)-benzene.

*Analysis.*—Calcd. for $C_{15}F_{18}$ (percent): C, 34.48; F, 65.51. Found (percent): C, 34.18; F, 65.34.

The infrared spectrum of the compound showed a strong absorption at 1637 cm.$^{-1}$ ascribable to a double bond stretching frequency and the mass spectrum confirmed the assigned structure with a molecular ion at $m/e=522$.

What is claimed is:

1. The compound having the formula

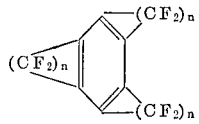

wherein $n$ is 2, 3, or 4.

2. The compound according to claim 1 in which $n$ is 4, and having the formula

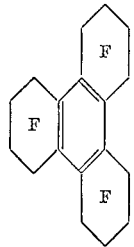

3. The compound according to claim 1 in which $n$ is 2, and having the formula

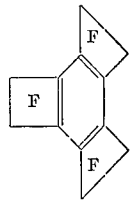

4. The compound according to claim 1 in which $n$ is 3, and having the formula

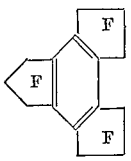

5. A method for preparing the compound having the formula

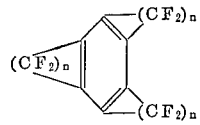

wherein $n$ is 2, 3, or 4, comprising the steps of passing the corresponding fluoroalicyclic compound of the group consisting of

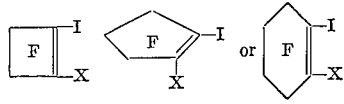

wherein X is chlorine, bromine or iodine, or combinations thereof, through metallic copper at a temperature of from about 200–220° C.; and isolating the product.

References Cited
UNITED STATES PATENTS
3,424,804  1/1969  Tilney-Bassett.

DANIEL D. HORWITZ, Primary Examiner

U.S. Cl. X.R.
62—8; 252—9, 58